US005322031A

United States Patent [19]

Lerner et al.

[11] Patent Number: 5,322,031

[45] Date of Patent: Jun. 21, 1994

[54] COLOR CHANGE NIPPLE

[75] Inventors: Michael I. Lerner, Boston; Michael S. Bernstein, Natick; James D. Hammer, Quincy, all of Mass.

[73] Assignee: Safety 1st, Inc., Chestnut Hill, Mass.

[21] Appl. No.: 990,625

[22] Filed: Dec. 14, 1992

[51] Int. Cl.[5] ....................... G01D 21/00; A61J 11/00

[52] U.S. Cl. .................................... 116/208; 116/200; 606/234

[58] Field of Search ............... 116/200, 206, 208, 201; 606/234, 235, 236

[56] References Cited

U.S. PATENT DOCUMENTS

| | | | |
|---|---|---|---|
| 2,893,345 | 7/1959 | Kaufman | 116/206 |
| 3,317,283 | 5/1967 | King | 116/200 X |
| 3,542,519 | 11/1970 | Montalto et al. | 116/200 |
| 3,753,266 | 8/1973 | Ceniceros | 606/235 X |
| 3,923,067 | 12/1975 | Hurst | 606/236 |
| 4,279,213 | 7/1981 | Urahama et al. | 116/200 |
| 4,447,164 | 5/1984 | Berndt | 374/162 |
| 4,759,453 | 7/1988 | Paetzold | 215/11.1 |
| 4,802,255 | 2/1989 | Breuer et al. | 15/159 A |
| 4,832,214 | 5/1989 | Schrader et al. | 215/11.1 |
| 4,919,983 | 4/1990 | Fremin | 215/11.2 X |
| 4,925,730 | 5/1990 | Yamada et al. | 116/200 X |
| 4,984,697 | 1/1991 | Kelly | 215/11.1 |
| 5,213,760 | 5/1993 | Dziabo, Jr. et al. | 116/201 X |

FOREIGN PATENT DOCUMENTS

| | | | |
|---|---|---|---|
| 0016312 | 2/1935 | Australia | 606/234 |
| 3316824 | 11/1984 | Fed. Rep. of Germany | 606/236 |
| 1233465 | 10/1960 | France | 116/208 |
| 2457683 | 12/1980 | France | 606/234 |
| 2007096 | 5/1979 | United Kingdom | 116/206 |

*Primary Examiner*—William A. Cuchlinski, Jr.
*Assistant Examiner*—W. Morris Worth
*Attorney, Agent, or Firm*—Wolf, Greenfield & Sacks

[57] ABSTRACT

A wear indicator for a latex product having an underlying latex structure comprises an outer layer positioned over the latex structure. The outer layer comprises latex having a particulate filler for establishing pores in the layer and a soluble colorant that leaches out of the pores. The leaching of colorant is simulative of wear of the latex product since leaching of the colorant occurs through degrading environmental exposure.

33 Claims, 3 Drawing Sheets

COLOR CHANGE NIPPLE

FIELD OF THE INVENTION

This invention relates to a wear indicator for baby bottle nipples and other elastomeric products.

BACKGROUND OF THE INVENTION

Baby bottle nipples, pacifiers and other elastomeric products designed for oral use tend to wear and erode over time. Wear is accelerated by oral contact since products are chewed, gummed and acted upon by acids in the mouth. Wear of latex and elastomeric products is particularly problematic when such products are employed by infants and small children. If, for example, a baby bottle nipple becomes too worn, it may crack or break into pieces, potentially poisoning or choking the child.

Even when wear of latex products, such as nipples, is not so severe as to cause breakage, the nipple can become sticky and hard due to chemical breakdown. The nipple should be discarded in good time before breakdown of the latex occurs.

In the past, nipple wear could be assessed only by the subjective appearance of the product using relatively subjective indications such as cracking, stickiness, hardening and discoloration of the latex. These indications vary for different latex formulas. Thus, it would be desirable to provide a more positive and conclusive indicator of wear for baby bottle nipples and other latex products.

Some known methods of indicating wear on rubber, nylon and plastic products would not be completely acceptable for application to products which are suckled by infants. For example, one process of indicating wear, as disclosed in U.S. Pat. No. 4,802,255, has been utilized to indicate wear in nylon toothbrush bristles. The indicator comprises a dye that diffuses from color-impregnated brush bristles as the toothbrush is used. This process would prove unreliable as a wear indicator for latex products, since latex and other elastomers have substantially different chemical properties than nylon. Additionally, an impregnation process is not entirely suitable in products that are subjected to variable heating. A substantial source of wear in baby bottle nipples is the sterilization procedure using, for example, boiling water. Such boiling of baby bottle nipples and pacifiers would greatly accelerate the diffusion of impregnated dye. Typically, a nipple begins to degrade relatively rapidly after approximately sixty use/boiling cycles. Impregnated dye might not withstand sixty cycles before completely evacuating from the nipple. Thus, it could prove difficult to accurately gauge wear in boiled nipples using the nylon bristle wear indicator method.

In view of the disadvantages of the prior art, this invention has as one object to provide a wear indicator for an elastomeric product such as a latex baby bottle nipple that provides an accurate gauge of product deterioration while remaining safe for oral use by infants. It is a further object of this invention to provide a wear indicator that can be applied to products during manufacture and that can be formed into a variety of different shapes, colors and patterns on the product.

SUMMARY OF THE INVENTION

This invention provides a wear indicator for a product having an underlying structure comprising latex or similar elastomeric material. Over at least a portion of this structure is located an additional wear indicator layer. The wear indicator layer comprises a material having a chemical formula substantially the same as the underlying structure so that the indicator layer binds firmly to the underlying structure. The material includes a mineral filler that establishes microscopic pores in the indicator layer. Accordingly, the indicator layer is semiporous.

The indicator layer further includes a water soluble dye therein. The dye leaches from the pores upon exposure of the layer to moisture. The dye concentration and pore size are chosen so that leaching of the dye from the layer corresponds to wear of the structure due to environmental degradation. As dye leaches from the layer, the color fades which is indicative of wear.

The indicator layer can also include water insoluble pigments that remain fixed in the layer, so that leaching of the dye from the layer causes its color to change from that of the dye to that of the underlying water insoluble pigment.

The underlying structure, typically, a baby bottle nipple, can be provided with a wear indicator layer by dipping the underlying structure into a bath of material (such as uncured latex), filler and dye components. The wear indicator layer can, alternatively, be formed with the underlying structure in a molding process.

BRIEF DESCRIPTION OF THE DRAWINGS

The foregoing and other objects and advantages of the invention will become more clear with reference to the following detailed description as illustrated by the drawings in which.

DETAILED DESCRIPTION OF THE PREFERRED EMBODIMENT

Figure 1:
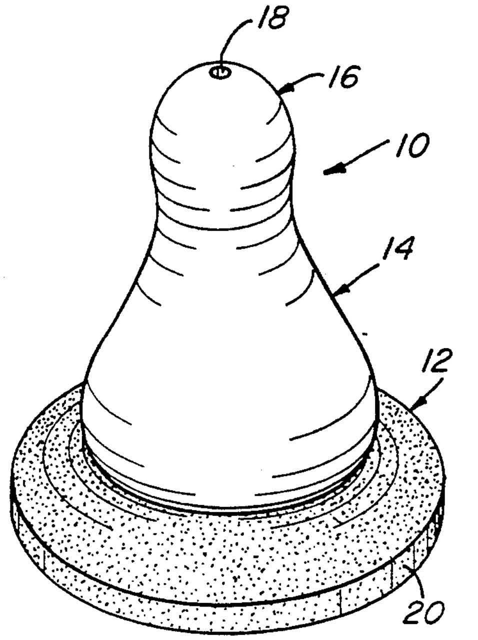
FIG. 1 is a perspective view of a baby bottle nipple having a wear indicator according to this invention.
Figure 2:
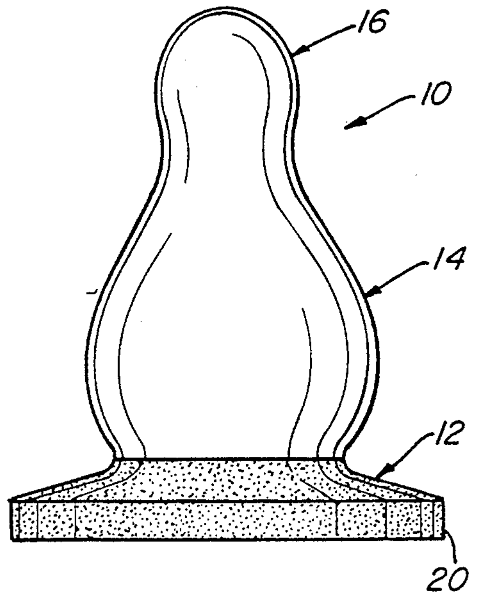
FIG. 2 is a side view of the baby bottle nipple of FIG. 1.

FIGS. 1 and 2 illustrate a baby bottle nipple 10 having a wear indicator according to this invention. Baby bottle nipples are typically constructed from latex or similar elastomeric rubber-like material. The wear indicator to be described herein can be utilized with a variety of rubber-like products having chemical characteristics similar to those of latex. Similarly, while a baby bottle nipple is used herein for purposes of illustration, the wear indicator according to this invention can be applied to a variety of other latex and rubber products such as contraceptive devices (diaphragms, for example), rubber gloves, pacifiers, teethers, and medical and surgical articles.

The nipple 10 of FIG. 1 is of relatively conventional design. It comprises a base 12 that is sealed between a baby bottle and its screw-on cap (not shown). The nipple includes an enlarged external section 14 that tapers to a tip 16 having a hole 18 for allowing liquid to exit from the nipple 10.

A ring 20 having a different color than the remaining nipple is positioned around the nipple base 12 as shown. Wear indication according to this invention occurs by color change along the ring surface. It is equally possible to locate the colored wear indicating portion of the nipple over the entire surface thereof or at a more localized location upon the nipple surface. To this end, the wear indicator can be formed as a fanciful pattern such as a cartoon figure or a face that, as will be described further below, changes color as wear of the nipple progresses.

Since the base 12 is usually covered by the cap of the baby bottle, the colored indicator portion is not normally visible according to this embodiment and, rather, is inspected upon disassemble during filling and/or cleaning. Location of the indicator in a normally non-visible position may be desirable since parents may be concerned, albeit unjustifiably, about the wear indicator coming into direct contact with the infant's mouth. As is described further below, the color change indicator according to this embodiment is safe even when disposed over the entire surface of the nipple.

The wear indicator according to this invention operates such that its color changes as nipple wear progresses so that an accurate indication of wear is always available to the user. The wear indicator is designed to take advantage of the fact that the nipple is exposed to moisture as it is utilized. The colored ring 20, according to this embodiment comprises an exposed outer layer of dye-containing latex. The layer is constructed as a porous medium that stores a water soluble dye. The dye leaches out of the pores over time due to moisture exposure, thus inducing a color change in the base 12 by means of dye loss. This dye loss leads to a gradual fading of the layer.

Figure 3:
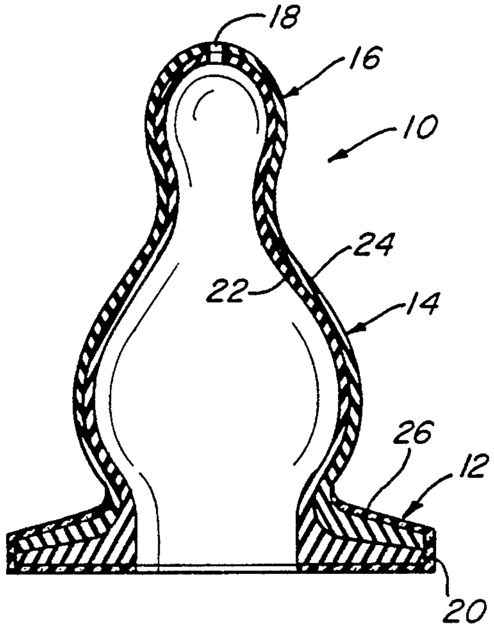
FIG. 3 is a vertical cross section of the baby bottle nipple of FIG. 1.

The basic structure of the nipple 10 is depicted in the cross sectional diagram of FIG. 3. The nipple 10 comprises a pair of latex layers 22 and 24 formed, according to one embodiment, by progressive dipping of a nipple former (not shown) into an uncured latex bath. The nipple can, however, be formed with fewer or greater layers and by alternate means such as molding. Along the exterior of the base 12 is positioned the wear indicator layer 26 in the form of the ring 20 that covers the base 12 and extends upwardly into contact with the external section 14. This layer 26 can be disposed upon the base by a variety of methods which will be described further below.

The wear indicator layer comprises a latex that is substantially identical in formula to the latex from which the base layers 22 and 24 of the nipple 10 are formed. Because of this, the wear indicator latex binds firmly to the preceding layers 22 and 24 of the nipple base 12 and displays essentially the same wear and other chemical properties as the underlying nipple structure 10. As noted above, water soluble dye is added into the latex of the layer 26. The dye leaches from the layer 26 via microscopic pores formed in the layer. These pores are generated in the latex by the addition of a mineral filler such as calcium carbonate, kaolin or silica to the latex while it is uncured and liquified. According to a preferred embodiment, calcium carbonate having a particle size of approximately 3-10 microns is utilized in combination with the latex. The latex and filler form a layer that is actually semiporous (having pores, but resisting penetration of water completely therethrough), but suitable for storing sufficient quantities of water soluble dye therein in a manner that allows the dye to leach from the layer 26. It should be noted that the porosity of the layer has a direct affect on the effectiveness of the layer in storing and releasing of colorant. Porosity is controlled substantially by the size of the filler particles. An average particle size of 6 microns has provided an effective indicator layer, but particle size can be varied to vary the characteristics of the layer. The layer thickness should be approximately 0.5-1.0 millimeter according to this embodiment.

The layer 26 can also include a non-water soluble pigment that forms a base colorant in the filler. Alternatively, the mineral filler can be used alone, without pigment, resulting in a layer having a more natural shade of gray or white. Non-water soluble pigments can include titanium dioxide, zinc oxide, ultramarine blue, pyrazole red, phthalocyanine green, phthalocyanine blue or pigment yellow 14. A combination of these pigments can be employed to alter the base color shade of the layer 26.

The pores formed by the filler provide a vehicle by which water can infiltrate the layer 26. By including a water soluble dye or other soluble colorant in the layer, the infiltrating water can slowly remove it over time causing a fading and, hence, a color change in the layer 26 from the soluble dye color to the insoluble pigment color. A suitable water soluble dye according to this embodiment is a U.S. Food and Drug Administration approved Food, Drug and Cosmetic (FD&C) colorant such as Blue #1 or Red #40. The colorant is added to the latex in a fraction of 0.01-0.05% by weight colorant to a given weight of latex. FD&C colorants are deemed completely safe for ingestion and, thus, will not harm the infant as they leach out of the base.

The indicator layer 26 should be constructed so that the water soluble dye leaches out within a predetermined number of use cycles. In general, an implement such as a baby bottle nipple will be sterilized by boiling before virtually every use. Boiling effectively accelerates the nipple wear process due to the damaging effects of high temperature heating on latex. A consequence of boiling, however, is that it provides a highly predictable environment for measuring wear since it causes far more pronounced wear to the nipple than other forms of environmental exposure. As noted above, a nipple is usable up until approximately sixty use/boiling cycles before it begins to degrade relatively rapidly. Hence, choosing the layer so that the dye leaches out substantially completely within sixty use/boiling cycles, will ensure accurate wear indication.

It should be noted that an indicator layer can be constructed for use with non-boiled articles. In fact, reasonable wear indication can be obtained for any object that is exposed to moisture. Absent exposure to boiling, wear of the product is slower, but so is the leaching of dye from the layer. The advantage of a wear indicator according to this invention is that dye leach-out closely tracks exposure of the article to moisture and the degree of severity (i.e. heat) at which that exposure occurs. Since moisture and heat have a very pronounced degenerative effect on the article (more of an effect than other environmental factors), there is a close correlation between dye leach-out and actual product wear.

As noted above, a water insoluble pigment can be included in the wear indicating layer as an optional enhancement. The water insoluble pigment can serve as a base layer color when the natural white or gray of the mineral filler is not desired. For example, a water soluble dye having a blue color can be used with an underlying insoluble pigment color of yellow. In use, the user knows that it is time to replace the nipple when the base turns from various shades of blue, to green and then to yellow. A chart can be provided to the user illustrating the color change that occurs as wear progresses allowing him or her to accurately track its progress.

Figure 1A:
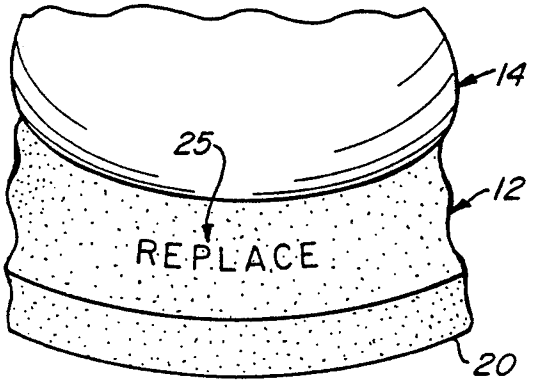
FIG. 1A is a partial perspective view of an indicator for a worn nipple according to one embodiment of this invention.

The underlying water insoluble pigment can also be applied to only discrete portions of the indicator layer. The pigment can, for example, spell out a word such as "REPLACE" as shown at 25 in FIG. 1A, or can be formed into an indicative character such as a trash can. As the water soluble dye leaches out of the layer, it reveals the underlying words or characters. When the words or characters become visible, the user knows that it is then time to replace the nipple.

Figure 4:
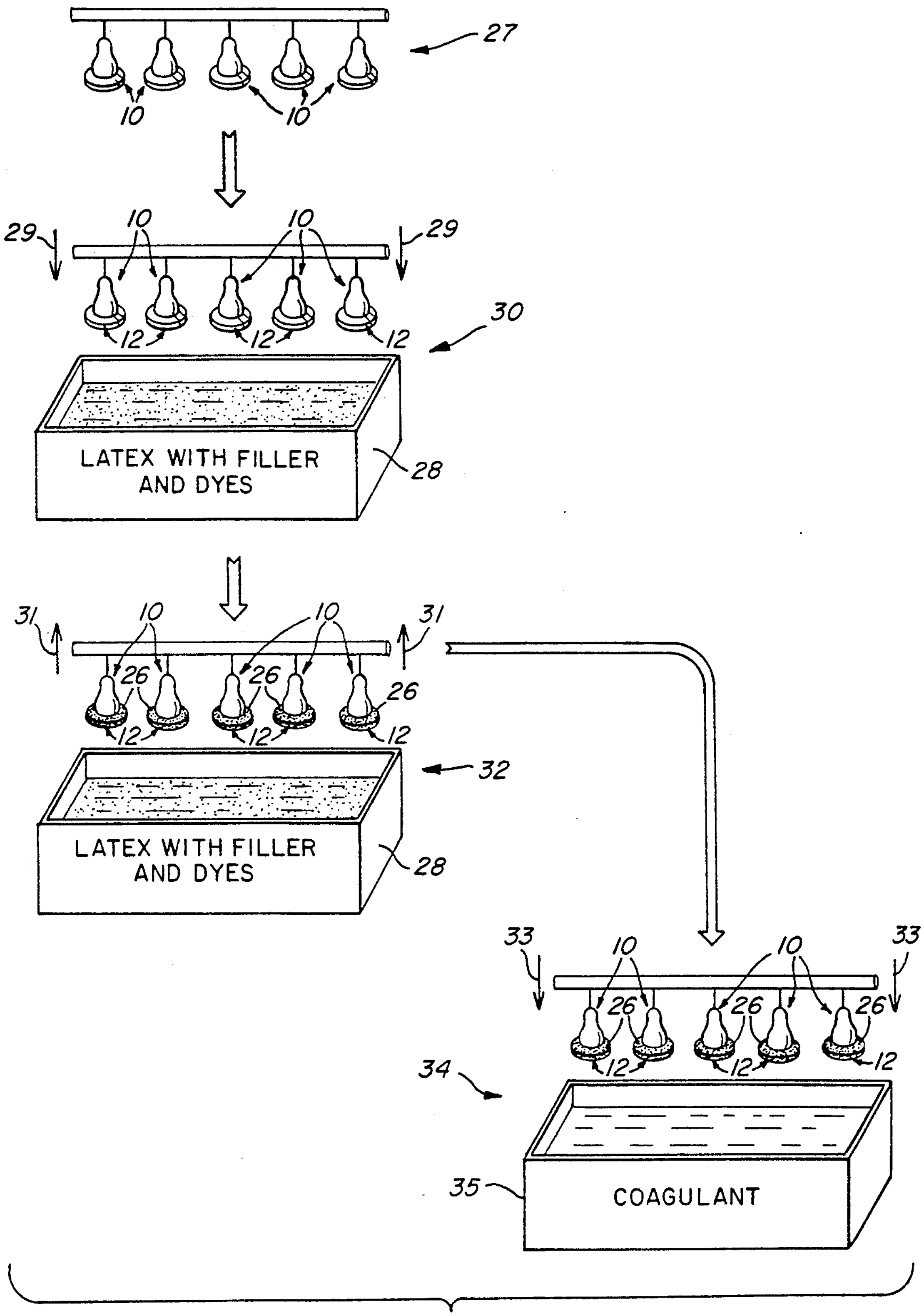
FIG. 4 is a schematic flow diagram of the manufacture of wear indicating nipples according to one embodiment of this invention.
Figure 5:
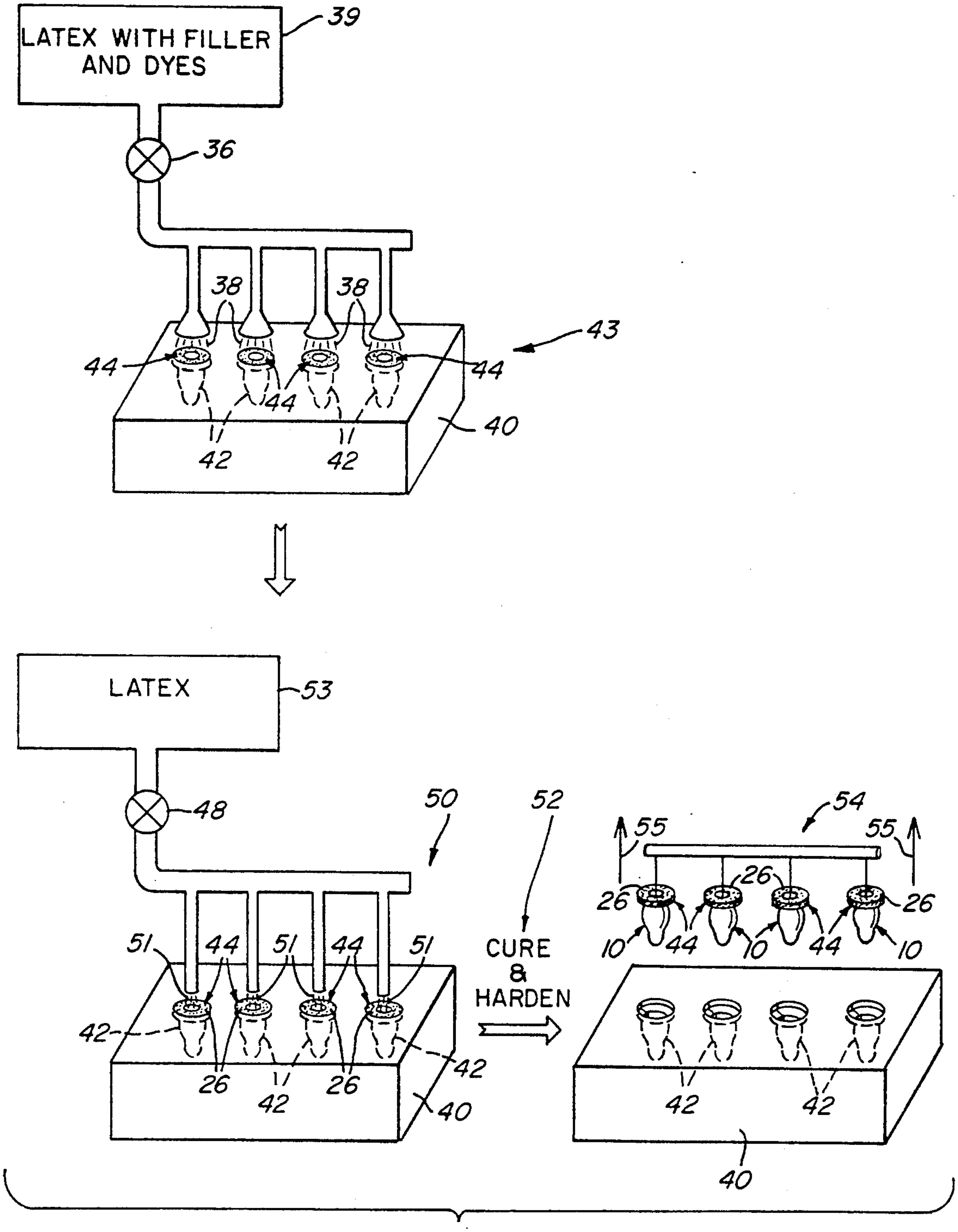
FIG. 5 is a schematic flow diagram of the manufacture of wear indicating nipples according to an alternative embodiment of this invention.

The manufacture of latex articles, specifically nipples, having a wear indicator according to this invention is detailed in FIGS. 4 and 5 according to two alternative embodiments. As noted above, a nipple can be formed via a dipping process (not shown) in which an internally located nipple former is dipped into liquid latex several times in order to obtain a surrounding nipple of predetermined thickness. The formation of the wear indicator layer according to this invention comprises an added dipping step or steps as detailed in FIG. 4. A plurality of nipples 10 can be treated at once as shown. The manufacturing process of FIG. 4 to form the indicator layer comprises three steps 30, 32 and 34.

Nipples 10 are first received from a source 27. Completed nipples can be utilized, or nipples formed in a prior dipping process, on-site, can be utilized according to this invention. Best results are often obtained when the source nipples 10 are formed just prior to wear indicator layer application so that manufacturing can proceed as a set of uninterrupted steps. Such uninterrupted manufacturing can provide a firmer adhesion between the nipple and wear indicator layer and allow final curing to occur in one step.

The base 12 of each source nipple 10 is first dipped (arrows 29) into a bath 28 including latex, mineral filler and appropriate dyes and pigments as illustrated in step 30. Some of the latex solution from the bath 28 adheres to the underlying nipple 10 forming a wear indicator layer 26 on the base 12 of the nipple 10. Once a sufficient amount of latex has adhered to the base 12 of each nipple 10, the nipples 10 are removed (arrows 31) from the latex, filler and dye solution bath 28 as shown in step 32. The wear indicator layer and underlying nipple 10 can then be set by dipping (arrows 33) in a coagulant bath 35, as shown in step 34 of this embodiment, and then cured by, for example, heating.

Insoluble pigments can also be added to the bath 28 to provide an underlying layer color. Discrete characters and words can also be applied to the indicator layer 26 in a separate step between, for example, a pair of indicator layer dipping steps. Application of words or characters can be accomplished using, for example, screen printing and equivalent processes (not shown). Printing should occur on top of the first of the pair of indicator layers, which is subsequently covered by a second. The printed words are revealed when enough water soluble dye leaches out.

An alternative method of constructing wear indicator nipples 10 according to this invention is detailed in FIG. 5. Unlike the embodiment of FIG. 4, formation of the nipple and wear indicator herein occur in the same process. Conversely, the underlying nipples in the FIG. 4 embodiment can be formed either in the same process or off-site, to be supplied in finished form. Nipples are formed by a molding process according to this embodiment. A variety of molding processes and latex injection techniques can be utilized according to this invention. The order of performing these steps can, likewise, vary from that described herein. The depicted method is, thus, meant to symbolize a variety of methods for placing latex into a mold.

The latex, filler and dyes form the outer wear indicator layer 26 of the nipple. According to this embodiment, a valve 36 is opened to permit an uncured liquid latex solution 38 with the mineral filler and appropriate dyes to enter a mold 40 having cavities 42 formed in the shape of nipples (step 43). The latex solution 38 is stored in a source 39. This layer 26 can be confined to the base portion 44 of the nipple mold 40 if desired. To confine the layer 26 to the base 44, it is assumed that conventional gating (not shown) is applied to the mold 40.

Subsequent to application of the wear indicator layer 26 to the mold 40, latex 51 is applied from an uncured latex source 53 using an appropriate valve 48 to form the underlying nipple structure 10 (step 50). Note that the wear indicator layer 26 is still uncured, and so the underlying nipple structure mixes with the wear indicator layer at their respective boundaries creating a fusion between layers.

The completed nipple 10 is then cured and hardened using appropriate coagulants and/or heating as illustrated in step 52. Completed nipples are then removed (arrows 55) from the mold 40 in a conventional manner as shown in step 54.

A typical formula for constructing a wear indicator layer according to a preferred embodiment is shown below. Each compound listed is provided as a percentage by weight in a given weight of indicator layer latex. The percentage range for each compound in the latex is as follows:

| Compound in a 60% Natural Latex Rubber Dispersion | % by Weight Of Indicator Layer |
|---|---|
| 50% Dipentamethylene Thiuram Tetrasulfide (SULFADS) Dispersion | 1-3% |
| 60% Zinc Oxide Dispersion | 1-10% |
| Nonylphenoxypolyethoxyethanol (1% aqueous) | 0-5% |
| Hydroxypropylmethylcellulose | 0-0.5% |
| Mineral Filler | 0-30% |
| Insoluble Pigment | 0-5% |
| Water Soluble FD&C Colorant | 0.01-0.5% |

As discussed above, the precise formula for the wear indicator layer should be chosen based upon the specific formulation of latex utilized. The primary ingredients in the formula are the latex, the mineral filler and the water soluble colorant. Insoluble pigment can be added to alter the underlying color of the layer. Other compounds, as listed above, can also be utilized to influence vulcanization, curing time and uncured latex viscosity to aid in manufacturing.

The foregoing has been a detailed description of preferred embodiments according to this invention. Various modifications and additions can be made to these embodiments without departing from the spirit and scope thereof. This description is, therefore, meant to be taken only by way of example and not to otherwise limit the scope of the invention. For example, while latex is a preferred material described herein, this term should be understood to include any type of elastomeric compound, such as synthetic rubbers, that can be combined with mineral fillers and water soluble dyes to produce a wear indicator according to this invention.

What is claimed is:

1. An indicator for a latex product having an underlying latex structure that indicates use cycles based upon progressive exposure to a solvent environment, the indicator comprising:

an outer layer positioned over the latex structure, the outer layer comprising latex having a particulate filler for establishing pores in the layer, and a soluble colorant dispersed in the layer that leaches out of the pores upon exposure to the solvent, whereby leaching of soluble colorant out of the pores causes a color change that indicates progressive exposure to the solvent simulative of environmental degradation.

2. An indicator as claimed in claim 1, wherein the filler comprises a mineral.

3. An indicator as claimed in claim 2, wherein the mineral is chosen from a list comprising calcium carbonate, kaolin, and silica.

4. An indicator as claimed in claim 1, wherein the soluble colorant comprises a dye.

5. An indicator as claimed in claim 4, wherein the dye comprises a water soluble dye.

6. An indicator as claimed in claim 5, wherein the dye comprises an FD&C colorant.

7. An indicator as claimed in claim 1, wherein the layer further includes a water insoluble colorant.

8. An indicator as claimed in claim 7, wherein the water insoluble colorant is selected from the group comprising titanium dioxide, zinc oxide, ultramarine blue, pyrazole red, phthalocyanine green, phthalocyanine blue, and pigment yellow 14.

9. An indicator as claimed in claim 7, wherein the soluble colorant substantially covers the insoluble colorant when the soluble colorant is in a substantially unleached state in the outer layer.

10. An indicator as claimed in claim 9, wherein the water insoluble colorant defines one of a word and a character and the soluble colorant substantially covers one of the word and the character in the substantially unleached state.

11. An indicator as claimed in claim 1, wherein the latex product comprises a nipple.

12. An indicator as claimed in claim 11, wherein the nipple includes a base ring and the outer layer defines a circumferential band on the base ring.

13. An indicator as claimed in claim 1, wherein the latex product comprises a pacifier nipple.

14. A method of indicating environmental exposure simulative of wear in a latex product comprising the steps of:

providing a latex structure having an overlying indicating layer of latex including pores therein;

providing a colorant in the indicating layer that leaches out of the pores upon environmental exposure over a predetermined period of exposure;

and monitoring color change in the indicating layer in response to colorant leaching.

15. A method as claimed in claim 14, wherein the step of providing the latex structure having the overlying indicating layer includes dipping the latex structure into a liquified solution of the overlying indicating layer and subsequently hardening the overlying indicting layer.

16. A method as claimed in claim 15, wherein the step of providing the latex structure includes forming the latex structure including dipping a former into a liquified solution of latex at least one time.

17. A method as claimed in claim 16, further comprising hardening the liquified solution to form the latex structure.

18. A method as claimed in claim 14, wherein the step of providing the latex structure having the overlying indicating layer includes molding the latex structure and the overlying indicating layer in a mold in a single step.

19. A method of constructing an indicator that displays progressive exposure to a solvent environment, simulative of a wear due to such exposure, in a latex product comprising:

providing a latex structure; and applying an outer layer over the structure, the outer layer comprising latex having a particulate filler for establishing pores in the layer and a soluble colorant that leaches out of the pores upon exposure to the solvent.

20. A method as claimed in claim 14 wherein the environmental exposure comprises exposure to water.

21. A method as claimed in claim 20 wherein the exposure to water comprises exposure to water having a temperature approximately at a boiling point of the water.

22. A nipple that indicates progressive exposure to a solvent environment, simulative of wear, comprising:

a nipple structure constructed of a pliable nipple material; and an indicating layer located on at least a part of the nipple structure, the indicating layer comprising a pliable nipple material having chemical characteristics similar to those of latex and including a particulate filler for establishing pores in the indicating layer and a soluble colorant that leaches out of the pores progressively upon exposure to the solvent environment.

23. The nipple as set forth in claim 22 wherein the nipple material comprises latex.

24. The nipple as claimed in claim 22 wherein the particulate filler comprises a mineral chosen from a list including one of calcium carbonate, kaolin, and silica.

25. A nipple as claimed in claim 22 wherein the soluble colorant comprises water soluble dye.

26. A nipple as claimed in claim 22 wherein the solvent environment comprises a water environment, the water having a temperature above room temperature.

27. A nipple as claimed in claim 25 wherein the indicating layer further comprises a water insoluble dye so that leaching of the water soluble dye exposes the water insoluble dye.

28. A nipple as claimed in claim 27 wherein the water insoluble dye defines one of a word and a character and wherein the water soluble dye substantially covers the water insoluble dye in an unleached state.

29. A nipple as claimed in claim 22 wherein the nipple includes a base ring and wherein the indicating layer is located on the base ring.

30. A method of indicating progressive environmental exposure, simulative of wear, in a flexible, rubber-like, article having chemical characteristics similar to those of latex exposed to a solvent environment comprising:

providing a flexible, rubber-like, material base structure;

providing an indicating layer constructed of the flexible, rubber-like, material over at least a portion of the flexible, rubber-like, material base structure, including providing a particulate filler for forming pores in the indicating layer;

providing soluble colorant in the indicating layer that leaches out of the pores upon exposure to the solvent environment over a predetermined period of exposure; and monitoring color change in the indicating layer in response to colorant leaching.

31. A flexible, rubber-like article that indicates progressive exposure to a solvent environment, simulative of wear, comprising:

a flexible, rubber-like, material base structure; and an indicating layer constructed of the flexible, rubber-like, material having chemical characteristics similar to those of latex located on at least a part of the flexible, rubber-like, material base structure, the indicating layer including a particulate filler for establishing pores in the indicating layer and a soluble colorant that leaches out of the pores progressively upon exposure to the solvent environment.

32. The article as set forth in claim 31 further comprising a colorant that is insoluble to the solvent environment, wherein leaching of the soluble colorant exposes the insoluble colorant.

33. The article as set forth in claim 32 wherein the insoluble colorant comprises one of a word and a character.

* * * * *